United States Patent [19]
Halonen

[11] Patent Number: 5,887,254
[45] Date of Patent: Mar. 23, 1999

[54] METHODS AND APPARATUS FOR UPDATING THE SOFTWARE OF A MOBILE TERMINAL USING THE AIR INTERFACE

[75] Inventor: Markku Halonen, Oulu, Finland

[73] Assignee: Nokia Mobile Phones Limited, Salo, Finland

[21] Appl. No.: 638,126

[22] Filed: Apr. 26, 1996

[51] Int. Cl.$^6$ .................................................. H04Q 7/32
[52] U.S. Cl. .............................. 455/419; 455/575
[58] Field of Search ................................. 455/419, 418, 455/403, 423, 414, 551, 412, 425, 575; 370/493, 494, 495

[56] References Cited

U.S. PATENT DOCUMENTS

| | | |
|---|---|---|
| 3,304,372 | 2/1967 | Filipowsky . |
| 4,434,461 | 2/1984 | Puhl . |
| 4,623,920 | 11/1986 | Dufresne et al. . |
| 4,654,867 | 3/1987 | Labedz et al. . |
| 4,831,647 | 5/1989 | D'Avello et al. . |
| 4,912,756 | 3/1990 | Hop . |
| 5,109,403 | 4/1992 | Sutphin ................................. 379/59 |
| 5,127,040 | 6/1992 | D'Avello et al. . |
| 5,249,302 | 9/1993 | Metroka et al. . |
| 5,297,191 | 3/1994 | Gerszberg ........................... 379/59 |
| 5,381,346 | 1/1995 | Monahan-Mitchell et al. . |
| 5,418,524 | 5/1995 | Fennell ........................... 340/825.22 |
| 5,418,837 | 5/1995 | Johansson et al. . |
| 5,430,877 | 7/1995 | Naylor . |
| 5,471,518 | 11/1995 | Barber et al. . |
| 5,524,135 | 6/1996 | Mizikovsky et al. . |
| 5,631,946 | 5/1997 | Campana, Jr. et al. . |
| 5,682,600 | 10/1997 | Salin . |
| 5,740,542 | 4/1998 | Leeper et al. . |
| 5,742,910 | 4/1998 | Gallant et al. . |
| 5,797,101 | 8/1998 | Osmani et al. . |

FOREIGN PATENT DOCUMENTS

| | | |
|---|---|---|
| B-77395/91 | 5/1991 | Australia . |
| 0 275 510 A2 | 7/1988 | European Pat. Off. . |
| 0 459 344 A1 | 12/1991 | European Pat. Off. . |
| 0 478 231 A2 | 4/1992 | European Pat. Off. . |
| 2 204 973 | 11/1988 | United Kingdom . |
| 2 249 923 | 5/1992 | United Kingdom . |
| 2 256 734 | 12/1992 | United Kingdom . |

*Primary Examiner*—William Cumming
*Assistant Examiner*—Linwood C. Scott, Jr.
*Attorney, Agent, or Firm*—Perman & Green, LLP

[57] ABSTRACT

A wireless user terminal (10), such as a cellular telephone, includes a transceiver (14, 16) for conducting bidirectional RF communications with a communications network (32) and a data processor (18b) for controlling the operation of the terminal. The terminal further includes (a) a first memory capable of storing a data processor program; (b) a second memory capable of storing a data processor program; (c) a memory device or register for storing a flag for indicating which of the first and second memories is a currently Active memory, that stores a currently active data processor program, and which of the first and second memories is a currently Idle memory; and (d) circuitry for receiving another data processor program from the communications network and for storing the received another data processor program into the Idle memory. The circuitry operates while the data processor executes the data processor program stored in the Active memory.

18 Claims, 3 Drawing Sheets

METHODS AND APPARATUS FOR UPDATING THE SOFTWARE OF A MOBILE TERMINAL USING THE AIR INTERFACE

FIELD OF THE INVENTION

This invention relates generally to radiotelephones and, in particular, to mobile terminals such as those capable of operation with a cellular network.

BACKGROUND OF THE INVENTION

It is known in the prior art to download information into a wireless telephone subscriber set or radio modem through the air interface from a central site, as evidenced by U.S. Pat. No. 5,297,191, "Method and Apparatus for Remotely Programming a Wireless Telephone Set" by I. Gerszberg, and by U.S. Pat. No. 5,418,524, "Method and Apparatus for Over-the-Air Upgrading of Radio Modem Application Software", by R. D. Fennell.

In this latter U.S. patent a selective call receiver includes a processor and a memory. The processor receives upgrade data and upgrade installation software, upgrades the modem's application software using the upgrade data, and then deletes the upgrade installation software and upgrade data.

It can be appreciated that the ability to update the software of a mobile terminal using the air interface is a significant advantage to both network subscribers and network providers, as the update can be accomplished without requiring the subscriber to return the terminal to a dealer or service center. Using the air interface to upgrade the terminal's software enables the service provider to download new and enhanced value-added features to requesting mobile terminals, and/or to update all subscriber terminals to take advantage of revisions to the applicable air interface standard. An air interface standard can be considered to be a set of rules or protocols which must be followed to successfully operate the mobile terminal in a given network over the air (i.e., wireless radio) interface. The standard known as IS-136.1 is one such air interface standard.

It can then further be appreciated that it is important to provide an efficient and accurate technique to upgrade the operating program of a mobile terminal over the air interface so as to cause a minimum impact on the availability of the mobile terminal to the user.

OBJECTS OF THE INVENTION

It is a first object of this invention to provide an efficient and accurate technique to update the operating software of a mobile terminal over the air interface.

It is a further object of this invention to provide methods and apparatus for downloading operating software to a mobile terminal and for storing the downloaded software, without causing a significant disruption in service or availability of the mobile terminal.

SUMMARY OF THE INVENTION

The foregoing and other problems are overcome and the objects of the invention are realized by methods and apparatus in accordance with embodiments of this invention. A method of this invention is disclosed for operating a wireless mobile or user terminal having a transceiver for conducting bidirectional RF communications with a communications network. The method includes the steps of: (a) operating the terminal with a first computer program that is stored in a first memory; (b) receiving a second computer program from the communications network and storing the received second computer program into a second memory; and (c) after the second computer program is stored in the second memory, operating the terminal with the second computer program. The step of receiving preferably receives the second computer program as a plurality of code blocks.

Further in accordance with this invention a wireless user terminal includes a transceiver for conducting bidirectional RF communications with a communications network and a data processor for controlling the operation of the terminal. The terminal further includes (a) a first memory capable of storing a data processor program; (b) a second memory capable of storing a data processor program; (c) a memory device or register for storing a flag for indicating which of the first and second memories is a currently Active memory, that stores a currently active data processor program, and which of the first and second memories is a currently Idle memory; and (d) circuitry for receiving another data processor program from the communications network and for storing the received another data processor program into the Idle memory. The circuitry operates while the data processor executes the data processor program stored in the Active memory.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
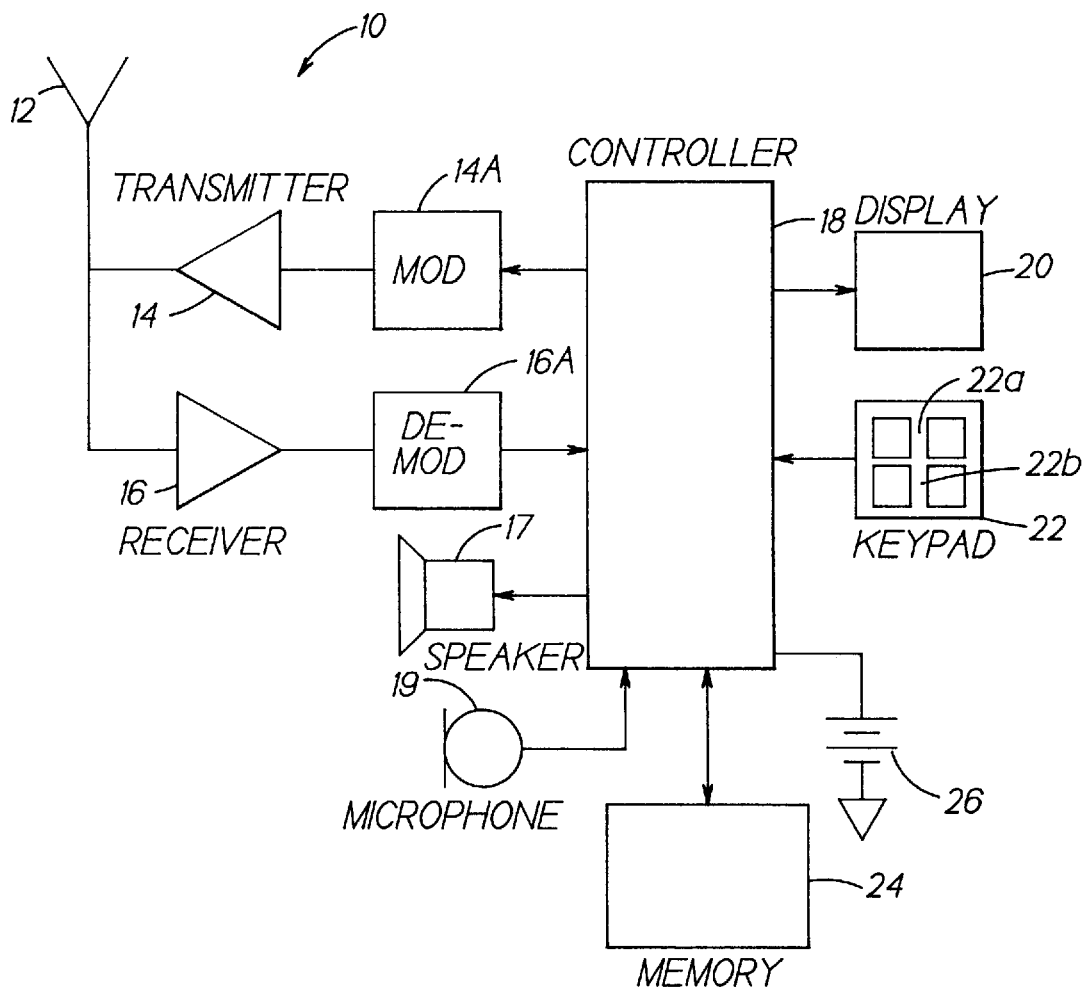
FIG. 1 is a block diagram of a mobile terminal that is constructed and operated in accordance with this invention.
Figure 2:
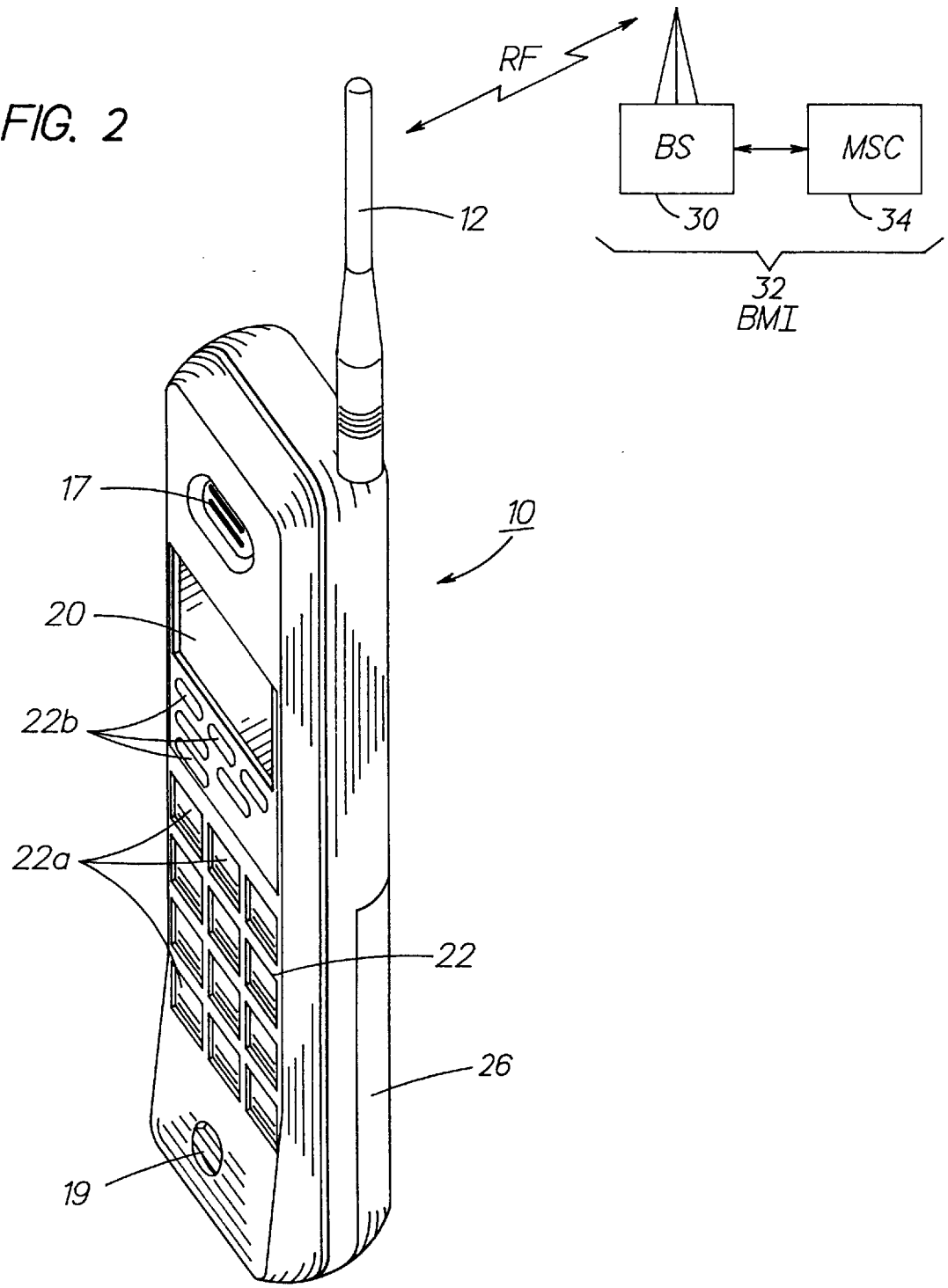
FIG. 2 is an elevational view of the mobile terminal shown in FIG. 1, and which further illustrates a cellular communication system to which the mobile terminal is bidirectionally coupled through wireless RF links.

Reference is made to FIGS. 1 and 2 for illustrating a wireless user or mobile terminal 10, such as but not limited to a cellular radiotelephone or a personal communicator, that is suitable for practicing this invention. The mobile terminal 10 includes an antenna 12 for transmitting signals to and for receiving signals from a base site or base station 30. The base station 30 is a part of a cellular network comprising the BMI 32 that includes a Mobile Switching Center (MSC) 34. The MSC 34 provides a connection to landline trunks when the mobile terminal 10 is registered with the network.

The mobile terminal includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile terminal 10. These other keys 22b may include, by example, a SEND key, various menu scrolling and soft keys, and a PWR key.

The mobile terminal 10 also includes various memories, shown collectively as the memory 24, wherein are stored a plurality of constants and variables that are used by the controller 18 during the operation of the mobile terminal. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. The construction of the memory 24, and its interface to the controller 18, is described in greater detail below with reference to FIG. 3.

The mobile terminal 10 also includes a battery 26 for powering the various circuits that are required to operate the terminal.

It should be understood that the mobile terminal 10 can be a vehicle mounted or a handheld device. It should further be appreciated that the mobile terminal 10 can be capable of operating with one or more air interface standards, modulation types, and access types. By example, the mobile terminal may be capable of operating with any of a number of air interface standards, including but not limited to IS-136, GSM, EIA/TIA 627, IS-91 and IS-95 (CDMA). Narrow-band AMPS (NAMPS), as well as TACS, mobile terminals may also benefit from the teaching of this invention. It should thus be clear that the teaching of this invention is not to be construed to be limited to any one particular type of mobile terminal or air interface standard.

The operating program in the memory 24 may include routines to present messages and message-related functions to the user on the display 20, typically as various menu items. The memory 24 also includes routines for implementing the method described below in relation to FIG. 3.

Figure 3:
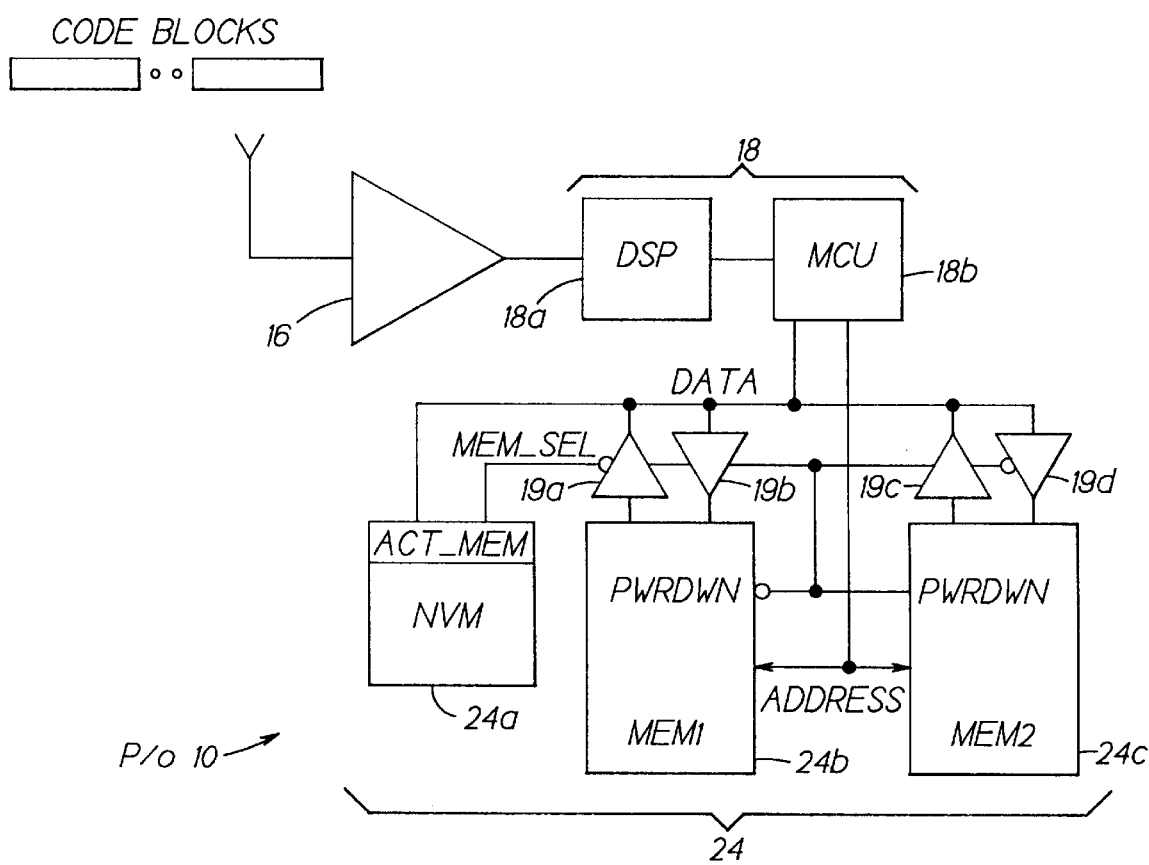
FIG. 3 is block diagram that illustrates in greater detail a portion of the mobile terminal of FIG. 1.

Reference is now made to FIG. 3 for showing a portion of (P/O) the mobile terminal 10 of FIG. 1 in greater detail. More particularly, the controller 18 is shown to be comprised of a digital signal processor (DSP) 18a and a microprocessor control unit (MCU) 18b. The DSP 18a is connected to the output of the receiver 16 and functions to demodulate received transmissions, decode any encoded voice or other transmissions, and to generally perform high speed signal processing of the received transmissions. The MCU 18b is connected to the DSP 18a, and operates on the decoded information to generally control the operation of the terminal 10 to place and receive calls, to operate the keypad 22 and the display 20, to monitor the charge state of the battery 26, and other required functions. The software routines executed by the MCU 18b to operate the mobile terminal 10 are referred to herein as its operating program. A typical size of the operating program for a modern mobile terminal, such as a cellular telephone, is several hundred kilobytes.

The memory 24 is shown to include a non-volatile memory (NVM) 24a, such as an EEPROM, wherein is stored the terminal's NAM(s), status flags, and other information that is required to be maintained when the terminal is powered down.

In accordance with this invention the memory 24 also includes a first memory (MEM1) 24b and a second memory (MEM2) 24c, both of which are addressable though an address bus sourced by the MCU 18b. The memories 24b and 24c are provided to store the operating program for the MCU 18b. The memories 24b and 24c may be conventional Flash-type memories that can be programmed in-situ, typically by providing an appropriate programming voltage that is derived either from the terminal's normal power supply or from an external power adapter/recharger. The memories 24b and 24c can be, by example, one Flash memory chip that is divided into two memory banks (each of which is considered as a separate memory for the purposes of this invention), or can be two separate Flash memories chips. In either case, one of the memories is at any given time designated as the Active memory, while the other is designated as the Idle memory. The MCU 18b executes program instructions out of the Active memory. Further in accordance with this invention the MCU 18b is enable to load a received operating program into the currently Idle memory while continuing to operate. the mobile terminal 10 from the Active memory. When the mobile terminal 10 is first constructed an operating program is preferably stored into one or the other of the memories 24b or 24c.

The NVM 24a stores an Active Memory (ACT_MEM) flag for specifying which of the memories 24b or 24c is the currently Active memory. The Active Memory flag can be a single bit. The state of the Active Memory flag can be considered as a memory select (MEM_SEL) signal used for enabling one of the memories 24b or 24c for being read by the MCU 18b, while enabling the MCU 18b to store an operating program into the other memory. This function is indicated schematically by the buffers 19a–19d (active high) which couple the memories 24b and 24c to the MCU data bus. By example, assume that when the Active Memory flag is zero the MEM1 24b is specified as the Active memory, and when the Active Memory flag is a one the MEM2 24c is specified as the Active memory. When the Active Memory flag is zero then the buffer 19a is enabled for reading out of MEM1 24b, the buffer 19d is enabled for writing into MEM2 24c, and the buffers 19b and 19c are disabled. Conversely, when the Active Memory flag is a one buffers 19a and 19d are disabled, buffer 19c is enabled for reading out of MEM2 24c, and buffer 19b is enabled for writing into MEM1 24b. The Idle memory, when not being loaded, may be powered down to conserve battery power.

It should be realized that the interface circuitry shown in FIG. 3 is not intended to represent an actual hardware implementation, but is provided to aid in the conceptual understanding of the invention. Those skilled in the art may devise a number of suitable hardware implementations for interfacing the memories 24b and 24c to the MCU 18b, when guided by the teaching of this invention.

As an example of the operation of the invention, assume that the MEM1 24b stores a currently valid operating program for the MCU 18b, and that the Active Memory flag is set to zero. The mobile terminal 10 then receives a message from the BMI 32 that a download of a new or revised operating program is to occur. Subsequently the BMI 32 begins transmitting the new or revised operating program to the mobile terminal 10 as a plurality of code blocks. By example, the code blocks can be sent using so-called Short Message Service (SMS) messages, or can be sent over a data channel, or can be sent using so-called System Operator Code (SOC) signalling, all of which are specified for use in the standard referred to as IS-136. Each code block is comprised of a plurality of machine-readable instructions, data, and the like that are required by the microprocessor which implements the MCU 18b to execute the mobile terminal operating program. Each code block also preferably includes some type of data integrity portion, such as well-known cyclic redundancy check (CRC) syndrome bits and/or parity bits. The correct receipt of each code block may be required to be acknowledged (ACKed)

by the MCU 18b before the next code block is transmitted by the BMI 32, or the MCU 18b may send a negative acknowledgement (NAK) only when an erroneous and uncorrectable code block is received. The received code blocks are passed through the DSP 18a to the MCU 18b, which stores the received code blocks into the MEM2 24c. After the new or revised program is completely received, the MCU 18b changes the Active Memory flag in the NVM 24a to a one, thereby designating MEM2 24c as the Active memory and MEM1 24b as the Idle memory. The MCU 18b then resets itself to an initial state and begins executing code from the memory 24c.

The previous program in the now-idle MEM1 24b can be erased by the MCU 18b, or it can be left intact until the next program download occurs, at which time it can be erased or simply written over. In some applications it may be desirable to leave the previous program stored in the Idle memory in case that it later becomes desirable to revert back to the previous operating program. By example, in the unlikely event that it is later discovered that the most recently loaded operating program was defective, the mobile terminal 10 could be instructed by the BMI 32 to revert to the previous program for operation. This would be accomplished by simply changing the state. of (i.e., toggling) the Active Memory flag.

It is also within the scope of the invention to store, in either the NVM 24a or the Active memory 24b or 24c, an indication of the revision level of the currently active program, as well as the source of the program, the time and date at which the program was downloaded, and any other related information. For the case where the previous program is not erased, this identification information could also be retained. The stored program identification information may be subsequently interrogated from the BMI 32.

It is within the scope of the invention to provide the download control program itself in, by example, the NVM 24a, or to include it as part of the currently active program. That is, a download control program module of the currently active program is used to download the new program version into the Idle memory.

The downloaded program may be compressed prior to transmission by the BMI 32, and then decompressed by the mobile terminal 10 prior to storage into the currently Idle memory 24b or 24c. A number of suitable data compression and decompression techniques are well known in the art.

It can be appreciated that during a program download the mobile terminal 10 can remain registered with the network, can continue to make and receive calls, can send and receive messages, and can otherwise operate in a normal fashion. That is, the code blocks may be sent to the mobile terminal 10 over an extended period of time, during which the mobile terminal 10 continues to operate out of the currently Active memory 24b or 24c. It is within the scope of this invention, when operating in this mode, that the code blocks may be transmitted to the mobile terminal 10 even during an ongoing voice call as a background task. For example, code blocks may be sent on a digital speech channel during pauses in a conversation. Of course, the proper signalling and protocol must be first established between the mobile terminal 10 and the BMI 32 to implement this feature.

In order to download the new or revised operating program in a rapid fashion, it is also within the scope of this invention to place the mobile terminal 10 into a dedicated program download mode of operation, wherein the code blocks are continuously sent by the BMI 32 and received by the mobile terminal 10. When operating in this mode the mobile terminal 10 may be inhibited from receiving and originating calls and messages. However, the dedicated download mode can be terminated automatically if the user makes a call to an emergency service number. It may also be desirable to enable the user to terminate the dedicated download mode of operation so as to make a call, and to then reenter the dedicated download mode at the termination of the call. In this case the BMI 32 would begin by sending the next code block in the sequence of code blocks, at the point where the download operation was interrupted.

In either mode of operation the mobile terminal 10 continues to operate out the memory 24b or 24c that stores the currently active program until the BMI 32 indicates that the program download operation is completed. When the download operation is completed, the mobile terminal 10 is enabled to toggle the Active Memory flag, and to subsequently begin operating with the most-recently downloaded program. It should be noted that the mobile terminal 10 need not immediately begin operating with the new program. By example, a particular service provider may download a new operating program to several thousand mobile terminals over a period of days or weeks, and then later send a message to all of the mobile terminals to instruct them to begin using the new program.

In the various embodiments of this invention the new or revised program download operation can be initiated by a call placed from the mobile terminal 10 to the service provider, or vice versa. The program download can be accomplished in a point-to-point mode, that is, to one specific mobile terminal, or in a broadcast mode wherein a plurality of mobile terminals simultaneously receive the downloaded program.

It should be realized that a given operating program will typically be specific to a particular type of mobile terminal (e.g., manufacturer, model number, version, etc.), and will be written so as to be compatible with the particular microprocessor that implements the MCU 18b, the particular hardware and software architecture of the terminal, etc. As such, and by example, in order to implement one or more new network features the BMI 32 may be required to download a plurality of different versions of the new program, with each particular version being transmitted to a particular class or type of mobile terminal.

It should be apparent that while the invention has been described in the context of a number of exemplary embodiments thereof, a number of modifications to these embodiments may occur to one skilled in the art. For example, each of the memories 24b and 24c may be comprised of a plurality of memory chips, depending on the capacity of available memory chips and the size of the operating program. Thus, it will be understood by those skilled in the art that changes in form and detail may be made to the above described embodiments without, however, departing from the scope and spirit of the invention.

What is claimed is:

1. A method for operating a wireless user terminal having a transceiver for conducting bidirectional RF communications with a communications network, comprising the steps of:

operating the terminal with a first computer program that is stored in a first memory;

the step of operating including a step of receiving a second computer program from the communications network and storing the received second computer program into a second memory; and after the second computer program is stored in the second memory, operating the terminal with the second computer program; wherein the step of receiving includes the step of temporarily terminating the receipt of the second computer program in the event an operator of the mobile terminal requires the use of the transceiver.

2. A method as set forth in claim 1, wherein the step of receiving receives the second computer program as a plurality of code blocks.

3. A wireless user terminal comprising a transceiver for conducting bidirectional RF communications with a communications network and a data processor for controlling the operation of the terminal, said terminal further comprising:

a first memory capable of storing a data processor program;

a second memory capable of storing a data processor program;

means for storing a flag for indicating which of the first and second memories is a currently Active memory that stores a currently active data processor program and which of the first and second memories is a currently Idle memory; and means for receiving another data processor program from the communications network and for storing the received another data processor program into the Idle memory, while the data processor executes the data processor program stored in the Active memory said receiving means including means for temporarily terminating the receipt of the another computer program in the event an operator of the mobile terminal requires the use of the transceiver.

4. In a communications system comprising a communications network and a plurality of wireless user terminals each comprising a transceiver for conducting bidirectional RF communications with the communications network and a data processor for executing a stored program for controlling the operation of the terminal, a method for operating the system comprising the steps of:

operating each of the plurality of terminals with a first computer program that is stored in a first memory;

transmitting a second computer program from the communications network to at least one of the plurality of terminals; and in at least one of the plurality of terminals, receiving the second computer program from the communications network and storing the received second computer program into a second memory; wherein the step of receiving includes the step of temporarily terminating the receipt of the second computer program in the event an operator of the mobile terminal requires the use of the transceiver.

5. A method as set forth in claim 4, wherein the step of transmitting simultaneously transmits the second computer program to at least two of the plurality of terminals.

6. A method as set forth in claim 4, wherein the step of transmitting is accomplished in response to a call made by a terminal to the communications network.

7. A method as set forth in claim 4, wherein the step of transmitting is accomplished in response to a call made by the communications network to a terminal.

8. A method as set forth in claim 4, wherein the step of storing includes a step of changing a value of a flag for indicating which of the first and second memories is a currently Active memory that stores the received second computer program.

9. A method as set forth in claim 4, and further comprising the steps of:

receiving a command from the communications network to activate the stored second computer program;

in response to the command, setting a flag to indicate that the stored second computer program is a currently active computer program; and operating the terminal with the stored second computer program.

10. A method as set forth in claim 9, and further comprising the steps of:

receiving a second command from the communications network to deactivate the stored second computer program and to reactivate the first stored computer program;

in response to the command, setting a flag to indicate that the stored first computer program is a currently active computer program; and operating the terminal with the stored first computer program.

11. A method as set forth in claim 4, and further comprising a step of terminating the step of transmitting in response to a user originating a call from the terminal.

12. A method as set forth in claim 11, wherein the step of transmitting is terminated in response to the user originating a call to a predetermined telephone number.

13. A method as set forth in claim 4, and further comprising the steps of:

transmitting an interrogation from the system to at least one of the terminals; and in response to receiving the interrogation transmission, transmitting information from the terminal to the system for identifying at least one of the stored first or second computer programs.

14. In a communications system comprising a communications network and a plurality of wireless user terminals each comprising a transceiver for conducting bidirectional RF communications with the communications network and a data processor for executing a stored program for controlling the operation of the wireless user terminal, a method for operating the system comprising the steps of:

operating at least some of the plurality of wireless user terminals with a first operating computer program that is stored in a first memory of each of the plurality of wireless user terminals;

transmitting a second computer program from the communications network to at least one of the plurality of terminals; and in at least one of the plurality of wireless user terminals, receiving the second computer program from the communications network and storing the received second computer program into a second memory of the at least one wireless user terminal, while continuing to operate with the first operating computer program; wherein the steps of transmitting and receiving occur contemporaneously with a call made from or to the at least one of the plurality of wireless user terminals, wherein the call operation of the wireless user terminal is under the control of the first operating computer program.

15. A method as set forth in claim 14, wherein the steps of transmitting and receiving occur during pauses in speech that is being transmitted between the communications network and the at least one of the plurality of wireless user terminals.

16. In a telecommunications system comprising a network and a plurality of wireless user terminals each comprising a transceiver for conducting bidirectional RF communications with the network, via at least one base station, and a data processor for executing a stored program for controlling the operation of the wireless user terminal, a method comprising the steps of:

operating at least some of the plurality of wireless user terminals with a first, currently active computer program that is stored in a first memory of each of the plurality of wireless user terminals;

transmitting a second, currently inactive computer program from the network to at least one of the plurality of wireless user terminals; and in at least one of the plurality of wireless user terminals, receiving the second, currently inactive computer program from the network and storing the received second, currently inactive computer program into a second memory of the at least one wireless user terminal; wherein in a first mode of operation the steps of transmitting and receiving occur in a continuous fashion in a dedicated program download mode of operation, while the wireless user terminal is operating under the control of the first, active computer program stored in the first memory; wherein in a second mode of operation the steps of transmitting and receiving are interruptable upon an occurrence of at least one of a call made from the at least one of the plurality of wireless user terminals or a call made to the at least one of the plurality of wireless user terminals, while the wireless user terminal is operating under the control of the first, active computer program stored in the first memory; and further comprising steps of, changing a status of the first, currently active computer program to be inactive and changing a status of the second, currently inactive computer program to be active, and in response to an inquiry received from the network, transmitting information from at least one of the wireless user terminals, the transmitted information comprising data that is descriptive of an identity of at least one of the currently active computer program or the currently inactive computer program.

17. A method as in claim 16, wherein the steps of changing the status are executed automatically upon a completion of the steps of transmitting and receiving the second, currently inactive computer program.

18. A method as in claim 16, wherein the steps of changing the status are executed in response to a message received from the network.

* * * * *

UNITED STATES PATENT AND TRADEMARK OFFICE
CERTIFICATE OF CORRECTION

PATENT NO. : 5,887,254
DATED      : Mar. 23, 1999
INVENTOR(S): Halonen

It is certified that error appears in the above-identified patent and that said Letters Patent is hereby corrected as shown below:

IN THE CLAIMS:

Column 6, line 56, delete "wireless user terminal" and insert --radiotelephone--.
Column 6, line 60, delete "terminal" and insert --radiotelephone--.
Column 6, line 61, after the word "memory" insert --of the radiotelephone--.
Column 6, line 65, after the word "memory" insert --of the radiotelephone--.
Column 6, line 67, delete "terminal" and insert --radiotelephone--
Column 7, line 3, delete "mobile terminal" and insert --radiotelephone--.

Signed and Sealed this

Twelfth Day of October, 1999

Attest:

Q. TODD DICKINSON

*Attesting Officer*   *Acting Commissioner of Patents and Trademarks*